United States Patent Office 3,288,789
Patented Nov. 29, 1966

3,288,789
PROCESS FOR THE PRODUCTION OF HARD-
ENABLE COMPOUNDS CONTAINING EPOX-
IDE GROUPS
Manfred Budnowski and Manfred Dohr, Dusseldorf-Holthausen, Germany, assignors to Henkel & Cie. G.m.b.H., Dusseldorf-Holthausen, Germany, a corporation of Germany
No Drawing. Filed June 18, 1963, Ser. No. 288,593
Claims priority, application Germany, June 20, 1959, H 36,702; Jan. 31, 1963, H 48,117
16 Claims. (Cl. 260—248)

The present invention relates to an improved process for the production of hardenable compounds containing epoxide groups from the reaction of cyanuric acid with a mono-halogen-mono-vic.-epoxy-alkane.

This application is a continuation-in-part of our copending application, Serial No. 10,087, filed February 23, 1960, now abandoned.

It is known to produce hardenable compounds containing epoxide groups by reacting cyanuric acid in aqueous or alcoholic solution in the presence of an alkali metal hydroxide, with a halogen-epoxy-alkane, such as epichlorohydrin, or with a suitable dihalogen-alkanol, such as dichlorohydrin. Similarly, in a two-step reaction, cyanuric acid has been reacted with a slight excess of epichlorohydrin in the presence of a high-molecular weight catalyst to form the corresponding chlorohydrin ethers, and the latter were subsequently transformed into hardenable compounds containing epoxide groups by splitting off hydrogen halide with the aid of an alkaline reacting compound such as sodium hydroxide. In all these cases it is necessary to remove the inorganic salt formed by the reaction, such as sodium chloride, either by washing it out with water or by filtration, which always causes difficulties. Thereafter, the product must be freed from organic solvent or from water by heating in vacuo. In the latter case, additionally, two reaction steps are required.

An object of the invention is the production of hardenable compounds containing more than one epoxide group in the molecule in a one-step process from the reaction of cyanuric acid with a substantial excess of a mono-halogen-mono-vic.-epoxy-lower-alkane. The reaction can be improved with respect to reaction time by conducting the same in the presence of high-molecular weight catalysts insoluble in the reaction mixtures.

Another object of the invention is the development of a process for the production of hardenable compounds containing epoxide groups which does not require extensive purification to remove catalysts and by-products of the reaction.

A still further object of the invention is the obtention of hardenable compounds containing epoxide groups having, without further purification, a lighter color and lower viscosity than the known epoxide resins.

These and other objects of the invention will become more apparent as the description proceeds.

It has been found that hardenable compounds containing epoxide groups may be produced in simple fashion by reacting cyanuric acid with 30 mols or more of a mono-halogen-mono-vic.-epoxy-lower-alkane containing a halogen atom vicinal to the epoxide group at elevated temperatures. While a catalyst is not necessary, it is preferable to conduct the reaction in the presence of a high-molecular weight catalyst insoluble in the reaction mixture and containing polar groups selected from the group consisting of salt-like groups capable of forming salt-like groups under the reaction conditions, and acid amide groups.

The fact that the reaction between cyanuric acid and at least 30 mols of a mono-halogen-mono-vic.-epoxy-lower-alkane at elevated temperatures occurs to produce hardenable glycidyl compounds when no catalysts are present is totally unexpected. The reaction is apparently catalyzed to a sufficient degree by the cyanuric acid itself or by its reaction product. In this respect the cyanuric acid differs from other starting materials used for the preparation of epoxide resins, for instance from polyvalent phenols or carboxylic acids.

After completion of the reaction, unreacted epichlorohydrin can be readily recovered by distillation and may, if desired, after suitable purification be employed for further batches. The dichlorohydrin formed by the reaction may also be readily removed by distillation and may again be transformed into epichlorohydrin in known fashion.

When the reaction is conducted in the presence of high-molecular weight catalysts insoluble in the reaction mixture, it is preferable to utilize a catalyst selected from the group consisting of alkali metal, ammonium and amine salts of polyacrylic acid, alkali metal, ammonium and amine salts of cation exchange resins, acid salts of anion exchange resins, the free base of anion exchange resins, urea-formaldehyde condensation resins, hardened melamine-formaldehyde resins, vicinal epoxide resins hardened with organic polyamines, zwitter-ion exchange resins, and polyamide resins formed by the condensation of alkylene diamines with alkanedioc acids. For isolating the epoxide compounds formed by the reaction, the catalyst is separated from the reaction mixture. Subsequently, the excess lower halogen-epoxy-alkane as well as volatile reaction products are distilled off.

Mono - halogen - mono - vic. - epoxy - lower - alkanes which contain a halogen atom selected from the group consisting of chlorine and bromine, vicinal to the epoxide group and which are reacted in accordance with the present invention with cyanuric acid include, for example, epichlorohydrin, epibromohydrin, 1,2-epoxy-3-chlorobutane, 1-chloro-2,3-epoxy butane, 1-chloro-2,3-epoxy-5-methoxy pentane and the like. The use of epichlorohydrin as the starting material is preferred. Commercial, technical grade epichlorohydrin with a water content of about 0.1% can be used without purification or drying. The epoxide oxygen content of the end product is lowered by only a minor extent by the presence of small amounts of water.

The amount of lower halogen-epoxy-alkane required to effect the reaction is thirty mols or more per mol of cyanuric acid. In order to obtain reaction products with high epoxide values, it is advantageous to use the mono-halogen-mono-vic.-epoxy-lower-alkane in substantially greater excess. A larger excess, such as up to about 100 mols per mol of cyanuric acid, produces under otherwise identical conditions an increase in the epoxide content of the reaction product. The unreacted lower halogen-epoxy-alkane is not changed by the reaction and may readily be recovered and used over again.

Depending upon the excess of mono-halogen-mono-vic.-epoxy-lower-alkane which is employed, the epoxide compounds produced from cyanuric acid and mono-halogen-mono-vic.-epoxy-lower-alkane in accordance with the present invention contain about 8.5–11.5% of epoxide oxygen. The products are readily soluble in hot water. Their solubility is somewhat lower in cold water, but it can be substantially improved by the addition of small amounts of water-miscible solvents, such as acetone, methanol, ethanol or isopropanol.

In the absence of catalyst, the reaction is performed at elevated temperatures between 80 and 200° C., preferably between 100 and 180° C. The reaction may be performed at atmospheric pressure, for instance under reflux, or also at elevated pressures. Especially in the latter case it is advantageous to use an inert protective gas, such as nitrogen.

The reaction period is dependent upon the temperature. If the reaction is carried out at atmospheric pressure under reflux, a reaction period of about 10 to 20 hours is necessary for complete reaction. At elevated temperatures between 150 and 180° C. good results are obtained in as little as 15 to 45 minutes.

In the catalytic reaction the reaction times are decreased somewhat. Other than this, the reaction is identical and the products produced are the same.

Suitable high-molecular weight catalysts containing polar groups selected from the group consisting of salt-like groups, groups capable of forming salt-like groups under the reaction conditions and acid amide groups, are those materials which do not dissolve in the reaction mixture during the course of the reaction and which may therefore be readily separated after completion of the reaction by mechanical means. Use of these high-molecular weight catalysts avoids the requirement that the reaction product must be freed from catalyst in a laborious manner, for example, by washing, or that residual amounts of catalyst remaining in the reaction product cause undesirable side reactions during the removal of the volatile components of the reaction mixture by distillation.

Primarily suitable as catalysts are those compounds which contain salt-like groups, for example, the salts of high-molecular weight organic acids, such as alkali metal, ammonium or amine salts of polyacrylic acid. It is particularly advantageous to use the so-called ion exchange resins as catalysts. Cation exchange resins which may contain acid groups, such as sulfonic acid groups, carboxyl groups, phosphonic acid groups and the like, are used for the process according to the present invention in the form of their salts, for example, in the form of their alkali metal, ammonium or amine salts. It is further possible to use anion exchange resins as catalysts, that is, ion exchangers with basic groups, such as amino groups, quaternary ammonium or phosphonium groups as well as ternary sulfonium groups, in the form of their salts with acids, such as in the form of their chlorides or sulfates.

A further group of suitable catalysts includes those high-molecular weight compounds which contain reactive groups which may be transformed into salt-like groups under the prevailing reaction conditions. Examples of such compounds are high-molecular weight organic bases, such as anion exchangers, in the form of their free bases. Also other resins which contain a basic nitrogen atom, which can be transformed into a quaternary compound with epihalohydrins under the reaction conditions are suitable as catalysts, for example, hardened melamine-formaldehyde condensation resins or vicinal epoxide resins which have been hardened with organic polyamines. Furthermore, high-molecular weight compounds containing divalent sulfur atoms which are capable of being transformed into ternary sulfonium compounds by reaction with lower halogen-epoxy-alkanes under the reaction conditions may be used as catalysts.

Further suitable catalysts are those high-molecular weight organic compounds which contain acid as well as basic groups in the molecule. Such products include, for example, the ion exchangers which are commercially available under the name of zwitter-ion resins. Of course, it is also possible to use as catalysts the so-called mixed ion exchangers, that is, mixtures of anion exchangers and cation exchangers.

Finally, suitable catalysts include those compounds which contain acid amide groups, such as polyamides of aliphatic polyamines and organic polycarboxylic acids, such as nylon, as well as the urea-formaldehyde condensation resins.

The above-mentioned catalysts are advantageously used in the process according to the invention in granulated form. Powdery components of the catalysts are advantageously removed by screening and/or washing prior to use. In this manner the separation of the catalyst from the reaction mixture, for example, by centrifuging, decanting or filtering, proceeds extremely smoothly. For filtration relatively coarse filters are sufficient. It is advantageous to employ small mesh wire screens for this purpose.

In general, the catalysts may be used as often as desired because they are not consumed except for a small degree of mechanical abrasion. In the event that their activity decreases after repeated use, they may be regenerated in very simple fashion. The type of regeneration depends upon the chemical structure of the particular catalyst. In many cases washing and swelling with water is sufficient. In other instances the catalysts are regenerated by treatment with salt solutions or with dilute acids or bases. A certain water content of the catalysts does not in general interfere with the reaction according to the invention and the catalysts may be used in the moist state after regeneration.

The amount of catalyst may vary within wide limits. The optimum amount depends upon the chemical structure of the catalyst and may readily be determined from one application to the next by preliminary tests. It is preferable to utilize from about 50 gms. to about 500 gms. per mol of cyanuric acid, but greater amounts may be employed. It is also obvious that smaller amounts may be employed although the rate of reaction will decrease.

The catalytic process according to the present invention can be performed by intimately mixing and heating the above-mentioned starting materials and the catalyst together for a few hours. In general, the reaction occurs at temperatures above 60° C. It is preferable to avoid temperatures above 200° C. In some cases it is advantageous to add an inert organic solvent to the reaction mixture. If epichlorohydrin is used as the mono-halogen-mono-vic.-epoxy-lower-alkane, which is particularly advantageous, especially if it is used in large excess, it is recommended to boil the reaction mixture under reflux. After the reaction, the catalyst is separated, for example, by passing the mixtures through a fine screen made of V4A stainless steel wire. The separation of the catalyst proceeds extremely smoothly and rapidly in this manner. Thereafter, the excess mono-halogen-mono-vic.-epoxy-lower-alkane, as well as the volatile reaction products, such as dichlorohydrin, are distilled off, preferably at reduced pressure. Small amounts of water which may be present in the reaction mixture, if water-containing catalysts or technical grade epichlorohydrin are used, are simultaneously removed, so that the reaction product is free from water. The mono-halogen-mono-vic.-epoxy-lower-alkane which is distilled off may be re-employed in subsequent condensations, possibly after a suitable cleaning procedure. The dihalohydrin formed by the reaction may readily be transformed into epihalohydrin in accordance with known procedures.

The hardenable compounds containing epoxide groups produced in accordance with the process of the invention are not the same as the epoxide resins produced in accordance with the known processes, for example, from cyanuric acid and epichlorohydrin in aqueous-alkaline solution. The products according to the invention differ from those of the prior art in that they have, in comparison with those products obtained by the known process, a lower viscosity and a lighter color.

In addition, a particular advantage of the products produced in the absence of a catalyst resides in that they are completely free from salts or other foreign materials. They are also superior in purity to the glycidyl compounds prepared by the catalytic process, because the latter contains small amounts of impurities introduced by abrasion of the catalysts which are employed. For this reason the product produced in the absence of a catalyst may be used with particular advantage in the field of electrical applications. Furthermore, in comparison to other epoxide resins, they have a particularly light color. By reaction with polyunsaturated fatty acids, lacquer resins which are practically colorless and produce light-fast coatings may be prepared from the epoxide compounds produced in the absence of a catalyst.

All the epoxide products produced by the invention may be hardened with all compounds which are suitable for use as hardeners for epoxide resins, for example, with organic bases or with di- or poly-carboxylic acids or their anhydrides. Their utilities are manifold. For example, they may be used in combination with suitable hardeners as adhesives, molding resins, lacquer resins or for the production of plastics reinforced with glass fibers. Quite generally, the new products may be used for all those purposes for which the use of epoxide resins has heretofore been proposed. Due to their advantageous properties, especially their low viscosity and their light color, they are in many cases superior to the previously known epoxide resins.

By bleaching with small amounts of up to 1% of organic peroxides such as methylethylketone peroxide or cyclohexanone peroxide, products which are colorless as water may be obtained without difficulties. The bleaching is carried out on the final product by contacting with the bleach at room temperature.

An increase in the epoxide oxygen content and a reduction in the halogen content of the products according to the invention may be achieved in various ways, for example, by working with a large excess of the particular mono-halogen-mono-vic.-epoxy-lower-alkane or by again treating the resin produced by the present process with epichlorohydrin and catalyst. In this manner products may be obtained, the composition of which approaches the composition of simple glycide ethers. In some cases, practically pure glycide ethers may even be obtained.

It is a particular advantage of the process according to the present invention that hardenable compounds containing epoxide groups with a widely varying epoxide oxygen content can be produced. In this manner the properties of the products may be varied within wide limits. For example, if it is desired to obtain a particularly short hardening period, a condensation product with a high epoxide oxygen content is used as the starting material as a rule. However, if it is desired to obtain a resin-hardening agent mixture with a longer working period, resins with a low epoxide oxygen content are selected. Also the elasticity of the hardened product may be varied by the epoxide oxygen content of the resins. Further variations are possible by the addition of plasticizing compounds.

The following examples will further illustrate the present invention and enable others skilled in the art to understand the invention more completely. It is to be understood, however, that the following examples are not to be construed as limitations on the practice of the invention.

*Example 1*

129 gm. (1 mol) of cyanuric acid and 5,550 gm. (60 mols) of anhydrous epichlorohydrin were refluxed for 19 hours while stirring. The temperature of the mixture rose from 115 to 119° C. during this time. Thereafter, the major amount of excess epichlorohydrin was distilled off under a pressure of 40 mm. mercury and then the residual volatile components were distilled off at a pressure of 1 mm. mercury up to a bath temperature of 110° C. 295 gm. of a light yellow, viscous resin were obtained, which had an epoxide oxygen content of 11.2%.

A sample of this resin was admixed with an equal amount by weight of phthalic acid anhydride. Test samples were prepared from this mixture, which furnished the following test results after 15 hours of hardening at 140° C.:

Shape stability at elevated temperatures according
  Martens (DIN 53458) _____°C__ 160
Brinell-hardness _____kg./cm.$^2$__ 1670

*Example 2*

129 gm. of cyanuric acid and 5,550 gm. of anhydrous epichlorohydrin were placed into a pressure vessel. The air in the vessel was displaced with nitrogen. Subsequently, nitrogen was introduced into the vessel until the pressure reached 5 atmospheres. The mixture was heated to 160° C. and was stirred at this temperature for 50 minutes. After cooling of the reaction mixture it was worked up in the same manner as described in Example 1. 297 gm. of a resin having an epoxide oxygen content of 10.8% were obtained.

A sample of this resin was admixed with phthalic acid anhydride in a ratio of 10:9. Test samples were prepared from this mixture, which produced the following test results after 15 hours of hardening at 140° C.:

Martens temperature _____° C__ 161
Brinell-hardness _____kg./cm.$^2$__ 1660

*Example 3*

129 gm. of cyanuric acid and 5,550 gm. of anhydrous epichlorohydrin were heated in a pressure vessel for 15 minutes at 180° C. under the same conditions as described in Example 2. Upon working up the reaction mixture, 301 gm. of a yellow resin having an epoxide oxygen content of 10.4% were obtained.

Test samples were prepared from this resin in the same manner as in Example 2, which furnished the following test results:

Martens temperature _____° C__ 150
Brinell-hardness _____kg./cm.$^2$__ 1440

*Example 4*

Additional tests were performed which illustrate the relation of the yield and the epoxide oxygen content to the mol ratio of the starting materials, the reaction temperature and the reaction period. The results are summarized in the following table:

TABLE

| Test No. | Cyanuric Acid, gm. | Epichlorohydrin, gm. | Mol Epichlorohydrin per Mol Cyanuric Acid | Reaction Temp., ° C. | Reaction Time, Min. | Yield, gm. | Epoxide oxygen content of Reaction Product, Percent |
|---|---|---|---|---|---|---|---|
| 4 | 129 | 2,770 | 30 | 150 | 50 | 300 | 8.2 |
| 5 | 129 | 3,700 | 40 | 150 | 50 | 295 | 9.0 |
| 6 | 129 | 4,620 | 50 | 150 | 50 | 295 | 9.7 |
| 7 | 129 | 11,100 | 120 | 150 | 50 | 280 | 10.8 |
| 8 | 129 | 3,700 | 40 | 110-112 | $^1$ 10 | 295 | 8.9 |

$^1$ Hours.

*Example 2*

129 gm. (1 mol) of cyanuric acid, 5,500 gm. (about 60 mols) of technical grade epichlorohydrin (water content about 0.1%) and 200 gm. of commercial anion exchanger ("Lewatit MN" in the form of its free base) were heated under reflux for seven hours while stirring. Thereafter, the catalyst was filtered off. The filtrate was freed from excess epichlorohydrin by distilling at about 50 mm. of Hg. The residual volatile components were distilled off at 0.5 mm. of Hg until the temperature of the boiling liquid reached 100° C. 264 gm. of a light colored resin remained behind. The product had the following characteristic values:

Epoxide oxygen content ___ 10.5%.
Chlorine _____ 6.2%.
Viscosity at 50° C. _____ 55,000 cp. (measured with Hoppler viscosimeter).
Color according to Lovibond (1″ dish) _____ 0.4 yellow, 0.0 red, diluted with acetone in ratio of 1:1).

The anion exchanger "Lewatit MN" is, according to the manufacturer, a strongly basic polycondensate which contains —$NR^+_3$ groups.

The run was repeated using the same ion exchanger in the form of its hydrochloric acid salt, whereby practically the same result was obtained.

100 gm. of the hardenable epoxide resin produced by the above example were admixed at about 100° C. with 60 gm. of a hardener consisting of 75% phthalic acid anhydride and 25% tetrahydrophthalic acid anhydride and poured in a form. Test samples were produced from this mixture which, after hardening for 14 hours at 140° C., furnished the following test results:

Shape retention according to Martens (DIN 53458) _____ ° C__ 135
Impact resistance _____cm.kg./cm.$^2$__ 14 to 17
Brinell hardness _____kg./cm.$^2$__ 1680

Another sample of 10 gm. of the hardenable epoxide resin described in the above example was admixed with 6 gm. of the above hardener. Hard aluminum strips of 100 mm. length, 20 mm. width and 2 mm. thickness were cemented with this mixture by simple overlapping of 10 mm. and the mixture was hardened for 14 hours at 140° C. The test samples thus produced exhibited the following shear strength values at various temperatures:

Temperatures: Shear strength, kg./mm.$^2$
25° C. _____ 2.5
100° C. _____ 2.8
200° C. _____ 2.2

Example 6

129 gm. of cyanuric acid, 5,500 gm. of technical grade epichlorohydrin (water content about 0.1%) and 300 gm. of a commercial moist cation exchanger ("Lewatit S 100" in the form of the sodium salt) were heated under reflux for 10 hours while stirring. The sump temperature rose during that time from 109° C. to 112° C. After cooling the catalyst was filtered off. The filtrate was worked up in the same mnaner as described in Example 1. 271 gm. of a light-colored epoxide resin were obtained which had the following characteristic values:

Epoxide oxygen content _____percent__ 11.1
Chlorine content _____do____ 5.9
Viscosity at 50° C. _____cp__ 35,000
Color according to Lovibond (1″ dish):[1]
 Yellow _____ 0.3
 Red _____ 0.1

[1] 1:1 dilution in acetone.

"Lewatit S100" is a strongly acid cation exchanger and is a sulfonated polystyrene whose $SO_3H$— groups are attached to the aromatic ring.

The run was repeated using the same ion exchanger, but not in the form of sodium salt but rather in the form of ammonium salt. 270 gm. of an epoxide resin with the following characteristic values were obtained:

Epoxide oxygen content _____percent__ 11.0
Chlorine content _____do____ 6.1
Viscosity at 50° C. _____cp__ 36,000

Color according to Lovibond (1″ dish):
 Yellow _____ 0.5
 Red _____ 0.2

Example 7

Example 6 was repeated, but in place of the cation exchanger 300 gm. of nylon cubes ("Zytel" a polyamide of an aliphatic polyamine and an organic polycarboxylic acid) were used as the catalyst. After working up the reaction mixture, 284 gm. of an epoxide resin having the following characteristic values were obtained:

Epoxide oxygen content _____percent__ 10.9
Chlorine content _____do____ 6.6
Viscosity at 50° C. _____cp__ 38,000

Color according to Lovibond (1″ dish):[1]
 Yellow _____ 0.5
 Red _____ 0.1

[1] 1:1 dilution in acetone.

Example 8

Using the same procedure as that described in Example 6, but using 300 gm. of a hardened, pulverized, commercial melamine-formaldehyde condensation resin as the catalyst, 288 gm. of an epoxide resin with the following characteristic values were obtained:

Epoxide oxygen content _____percent__ 9.4
Chlorine content _____do____ 8.1
Viscosity at 50° C. _____cp__ 58,000

Color according to Lovibond (1″ dish):[1]
 Yellow _____ 0.5
 Red _____ 0.3

[1] 1:1 dilution in acetone.

Example 9

Example 6 was repeated, but instead of the cation exchange resin, 300 gm. of an epoxide resin hardened with methylene bis-aniline were used as a catalyst. The epoxide resin was the product "Araldit F." The ratio of resin to hardener was 10:3. The resin was hardened for three hours at 120° C. This reaction mixture yielded 271 gm. of an epoxide resin having the following characteristic values:

Epoxide oxygen content _____percent__ 9.9
Chlorine content _____do____ 7.8
Viscosity at 50° C. _____cp__ 54,000

Color according to Lovibond (1″ dish):[1]
 Yellow _____ 0.7
 Red _____ 0.0

[1] 1:1 dilution in acetone.

The above examples illustrate the process of the invention. It will be readily apparent to those skilled in the art that the present invention is not limited to the specific embodiments, and that various changes and modifications may be made without departing from the spirit of the invention or the scope of the appended claims.

We claim:

1. A process for the production of hardenable compounds containing more than one epoxide group in the molecule consisting of the steps of intimately mixing at temperatures between about 60° C. and 200° C. a mixture comprising cyanuric acid and at least 30 mols per mol of cyanuric acid of a mono-halogen-mono-vic.-epoxy-lower-alkane, said halogen being selected from the group consisting of chlorine and bromine and being vicinal to said epoxide group, and recovering said hardenable compounds containing more than one epoxide group in the molecule.

2. A process for the production of hardenable compounds containing more than one epoxide group in the molecule consisting of the steps of intimately mixing at temperatures between about 80° C. and 200° C. a mixture consisting of (1) cyanuric acid and (2) mono-halogen-mono-vic.-epoxy-lower-alkane, said halogen being selected from the group consisting of chlorine and bromine and being vicinal to said epoxide group, said mono-halogen-mono-vic.-epoxy-lower-alkane being present in a quantity of from 30 to 100 mols per mol of cyanuric acid, and recovering said hardenable compounds containing more than one epoxide group in the molecule.

3. The process of claim 2 wherein said mono-halogen-mono-vic.-epoxy-lower-alkane is epichlorohydrin.

4. A process for the production of hardenable glycidyl esters of cyanuric acid having more than one epoxide group in the molecule consisting of intimately mixing at temperatures between about 100° C. and 180° C. a mixture consisting of cyanuric acid and from about 30 mols to about 100 mols per mol of cyanuric acid of epichlorohydrin, and recovering said hardenable glycidyl esters of cyanuric acid.

5. The process of claim 4 wherein said temperature is the refluxing temperature.

6. The process of claim 4 wherein said intimate mixing occurs at a temperature of from 150° C. to 180° C. under an elevated pressure of an inert gas.

7. A process for the production of hardenable compounds containing more than one epoxide group in the molecule consisting of the steps of intimately mixing at temperatures between about 80° C. and 200° C. a mixture consisting of (1) cyanuric acid, (2) mono-halogen-mono-vic.-epoxy-lower-alkane, said halogen being selected from the group consisting of chlorine and bromine and being vicinal to said epoxide group, said mono-halogen-mono-vic.-epoxy-lower-alkane being present in a quantity of from 30 to 100 mols per mol of cyanuric acid, and (3) an organic high-molecule weight catalyst, said catalyst being insoluble in the reaction mixture and being selected from the group consisting of alkali metal, ammonium and amine salts of polyacrylic acid, alkali metal, ammonium and amine salts of cation exchange resins, acid salts of anion exchange resins, the free base of anion exchange resins, hardened urea-formaldehyde condensation resins, hardened melamine-formaldehyde resins, vicinal epoxide resins hardened with organic polyamides, zwitter-ion exchange resins and polyamide resins formed by the condensation of an aliphatic diamine and an organic polycarboxylic acid, and recovering said hardenable compounds containing more than one epoxide group in the molecule.

8. The process of claim 7 wherein said catalyst is in granulated form, free from finely powdered components.

9. The process of claim 7 wherein said organic high-molecule weight catalyst is an alkali metal salt of a cation exchange resin.

10. The process of claim 7 wherein said organic high-molecular weight catalyst is an acid salt of an anion exchange resin.

11. The process of claim 7 wherein said organic high-molecular weight catalyst is a polyamide resin formed by the condensation of an aliphatic diamine and an organic polycarboxylic acid.

12. The process of claim 7 wherein said organic high-molecular weight catalyst is the free base of an anion exchange resin.

13. The process of claim 7 wherein said organic high-molecular weight catalyst is a vicinal epoxide resin hardened with an organic polyamine.

14. The process of claim 7 wherein said mono-halogen-mono-vic.-epoxy-lower-alkane is epichlorohydrin.

15. A process for the production of hardenable glycidyl esters of cyanuric acid having more than one epoxide group in the molecule consisting of intimately mixing at temperatures between about 80° C. and about 200° C. a mixture comprising (1) cyanuric acid, (2) from about 30 mols to about 100 mols per mol of cyanuric acid of epichlorohydrin, and (3) from about 50 gms. to about 500 gms. per mol of cyanuric acid of an organic high-molecular weight catalyst, said catalyst being insoluble in the reaction mixture and being selected from the group consisting of alkali metal, ammonium and amine salts of polyacrylic acid, alkali metal, ammonium and amine salts of cation exchange resins, acid salts of anion exchange resins, the free base of anion exchange resins, hardened urea-formaldehyde condensation resins, hardened melamine-formaldehyde resins, vicinal epoxide resins hardened with organic polyamines, zwitter-ion exchange resins and polyamide resins formed by the condensation of an aliphatic diamine and an organic polycarboxylic acid, separating said catalyst and recovering said hardenable glycidyl esters of cyanuric acid.

16. The process of claim 15 wherein said temperature is the refluxing temperature.

References Cited by the Examiner

UNITED STATES PATENTS

| 2,741,607 | 4/1956 | Bradley et al. | 260—248 |
| 2,809,942 | 10/1957 | Cooke | 260—248 X |
| 2,894,950 | 7/1959 | Lloyd | 260—248 |
| 3,176,027 | 3/1965 | Budnowski | 260—348.6 |

FOREIGN PATENTS

| 595,729 | 4/1960 | Canada. |
| 1,045,099 | 11/1958 | Germany. |

WALTER A. MODANCE, *Primary Examiner.*

J. M. FORD, *Assistant Examiner.*